(12) United States Patent
Kikuchi et al.

(10) Patent No.: US 9,517,808 B2
(45) Date of Patent: Dec. 13, 2016

(54) HANDLEBAR SWITCH

(71) Applicant: HONDA MOTOR CO., LTD., Tokyo (JP)

(72) Inventors: Yutaka Kikuchi, Wako (JP); Daisuke Kuriki, Wako (JP); Takeshi Inoue, Wako (JP); Tomoki Yamauchi, Wako (JP); Miku Otsuji, Wako (JP); Makoto Hattori, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 104 days.

(21) Appl. No.: 14/191,661

(22) Filed: Feb. 27, 2014

(65) Prior Publication Data

US 2014/0284187 A1    Sep. 25, 2014

(30) Foreign Application Priority Data

Mar. 21, 2013 (JP) ................................. 2013-058645

(51) Int. Cl.
*H01H 9/06* (2006.01)
*B62K 11/14* (2006.01)
*B62K 23/02* (2006.01)

(52) U.S. Cl.
CPC ............ *B62K 11/14* (2013.01); *B62K 23/02* (2013.01); *H01H 9/06* (2013.01); *H01H 2009/068* (2013.01)

(58) Field of Classification Search
CPC ... B62K 11/14; B62K 23/02; H01H 2009/068; H01H 9/06
USPC ..... 200/61.88, 293.1, 61.54, 61.85; 74/551.8
See application file for complete search history.

(56) References Cited

U.S. PATENT DOCUMENTS

| | | | |
|---|---|---|---|
| 4,847,454 A * | 7/1989 | Hiruma ..................... | 200/61.85 |
| 7,402,767 B2 * | 7/2008 | Tozuka et al. ............. | 200/61.54 |
| 2007/0199810 A1 * | 8/2007 | Ieda et al. ................. | 200/61.88 |
| 2010/0270135 A1 * | 10/2010 | Murasawa et al. ........ | 200/61.88 |

FOREIGN PATENT DOCUMENTS

| | | |
|---|---|---|
| FR | 2463044 A1 | 2/1981 |
| JP | S61-139885 A | 6/1986 |
| JP | 2007-050881 A | 3/2007 |

\* cited by examiner

*Primary Examiner* — Renee S Luebke
*Assistant Examiner* — Ahmed Saeed
(74) *Attorney, Agent, or Firm* — Squire Patton Boggs (US) LLP

(57) ABSTRACT

A handlebar switch can include a switch case housing switches, and manipulation members arranged on the switch case and configured to be manipulated by a driver to operate the respective switches. A center portion of the switch case 66 on which the manipulation members are arranged is formed as an expanded section expanded in radial directions of a main body section beyond a right end portion, and a left an end portion of the main body section. The manipulation members are arranged in a center part of the expanded section.

15 Claims, 6 Drawing Sheets

HANDLEBAR SWITCH

BACKGROUND

Field

Embodiments of the present invention relate to a handlebar switch to be attached to a handlebar for steering a vehicle, and more specifically relates to a handlebar switch suitable for a motorcycle.

Description of the Related Art

Japanese Patent Application No. 2007-50881 (Patent Document 1) discloses a configuration in which a handlebar switch including multiple switches packaged together is attached to a handlebar of a motorcycle.

SUMMARY

In the case of packaging multiple switches together, a switch box (switch case), which is a constituent of a handlebar switch, has a large capacity. As a result, the handlebar switch looks large, which causes a problem of degradation of the external appearance of the handlebar switch.

Thus, the present invention has an objective to provide a handlebar switch that looks compact in external appearance while securing the capacity of a switch case.

A handlebar switch according to certain embodiments of the present invention has the following aspects.

In certain embodiments, a handlebar switch to be attached to a handlebar for steering a vehicle includes a switch case in which switches for operating electric components of the vehicle are housed. The handlebar switch also includes manipulation members to be manipulated by an operator of the vehicle to operate the respective switches. At least one of the manipulation members is arranged in a center portion of the switch case. The center portion of the switch case is provided as an expanded section that is expanded in a direction crossing the handlebar beyond both end portions of the switch case in a direction along the handlebar, and the manipulation member is located in a center part of the expanded section.

In other embodiments, the expanded section has a first face to be opposed to the operator, and a second face extending seamlessly from the first face and being distant from the operator. The manipulation member is arranged not in the second face, but in the first face. A thickness of the expanded section on a first face side is a predetermined thickness, and a thickness of the expanded section on a second face side decreases as a distance from the first face increases.

In other embodiments, a width of remaining margins of the expanded section, which are obtained by excluding an arrangement part of the manipulation member from a width of the expanded section in the direction along the handlebar, is narrower than a width of the end portions of the switch case.

In other embodiments, at least one of the manipulation members is arranged in the expanded section, and a portion of the manipulation member is arranged to protrude from the expanded section in a front view.

In other embodiments, the manipulation member is a manipulation member for a switch to operate a front light of the vehicle as the electric component.

In other embodiments, corner parts of the expanded section and corner parts of both the end portions of the switch case are chamfered to incline with respect to the expanded section.

In other embodiments, an inclination width of the corner parts of both the end portions of the switch case is larger than an inclination width of the corner parts of the expanded section.

According to certain embodiments of the present invention, the center portion of the switch case is expanded beyond both the end portions thereof, and the manipulation member for the switch is arranged in the center portion. Thereby, the switch case is provided with the steps symmetric with the center portion (expanded section) centered. As a result, the handlebar switch is able to impress the operator as small in the direction along the handlebar, i.e., the width direction of the handlebar switch. Thus, the handlebar switch can be made to look compact visually.

In addition, the formation of the expanded section enables the switches to be housed in the expanded section.

In this way, according to certain embodiments of the present invention, the formation of the expanded section at the center portion of the switch case enables the handlebar switch to look compact in its external appearance while securing a capacity of the switch case for the switches.

According to other embodiments of the present invention, the expanded section on the second face side where no manipulation member is arranged has a shape not protruded but gradually thinned as the distance from the first face increases. This shaping makes the depth of the handlebar switch small, and offsets the handlebar switch toward the first face of the expanded section. When the thickness of the expanded section on the second face side is decreased in this way, it is possible to make the handlebar switch visually look much smaller when the operator looks at the handlebar switch.

According to other embodiments of the present invention, the width of the remaining margins of the expanded section excluding the arrangement part of the manipulation member is set narrower than the width of the end portions of the switch case. This setting can make the handlebar switch look so much smaller.

According to other embodiments of the present invention, since the portion of the manipulation member protrudes from the expanded section, the layout of the handlebar switch is designed in the shape tapered upward as indicated by two imaginary lines connecting both the end portions of the switch case, side portions of the expanded section, and the portion of the manipulation member. This layout is capable of making the driver feel that the handlebar switch has a compact shape.

According to other embodiments of the present invention, when the manipulation member is the manipulation member for the switch for operating the front light as the electric component of the vehicle, for example, the driver can adjust the direction of the light axis of the front light by manipulating the manipulation member.

According to other embodiments of the present invention, the corner parts of the expanded section and the corner parts of both the end portions of the switch case are chamfered to incline with respect to the expanded section. This makes the handlebar switch rounded as a whole in an arc shape. As a result, in a front view, the handlebar switch can be made to look compact. This also can improve the finger touch that the operator feels when touching any of the manipulation members.

According to other embodiments of the present invention, the inclination width of the corner parts of both the end portions of the switch case is set larger than the inclination width of the corner parts of the expanded section. This setting can make the handlebar switch look more compact, and further improve the finger touch that the operator feels when touching any of the manipulation members.

DETAILED DESCRIPTION

With reference to the accompanying drawings, a handlebar switch according to certain embodiments of the present invention is described in detail, in which the handlebar switch is attached to a handlebar of a vehicle.

Figure 1:
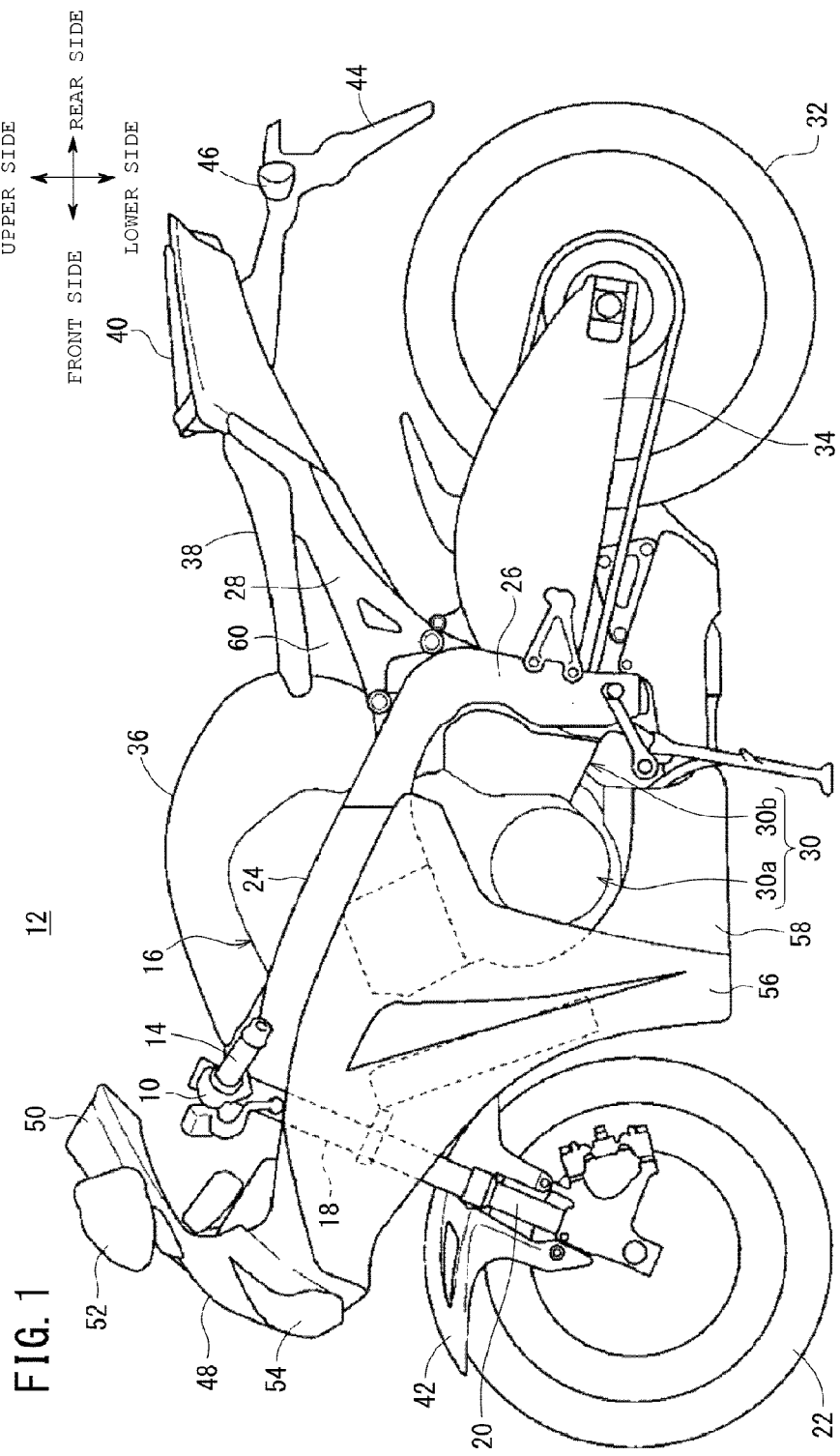
FIG. 1 is a side view of a motorcycle equipped with a handlebar switch according to an embodiment.

FIG. 1 is a side view of a motorcycle 12 as an example of a vehicle, the view illustrating a state where a handlebar switch 10 according to certain embodiments is attached to a handlebar 14 of the motorcycle 12.

It should be noted that, unless otherwise indicated, front-rear and up-down directions are described according to arrow directions in FIG. 1, and a left-right direction is described according to a direction viewed from a driver (operator) seated on a vehicle body. In addition, FIG. 1 illustrates a state where the handlebar switch 10 is attached to a left handlebar of the motorcycle 12 as one example.

The motorcycle 12 includes a vehicle body frame 16, a head pipe 18 provided at a front end portion of the vehicle body frame 16, a pair of left and right front forks 20 rotatably supported by the head pipe 18, a front wheel 22, which is a steering wheel rotatably supported by the pair of left and right front forks 20, and a bar-shaped steerable handlebar 14 attached to an upper portion of the pair of left and right front forks 20.

The vehicle body frame 16 includes a pair of left and right main frames 24 extending rearward from the head pipe 18, a pair of left and right pivot plates 26 provided on rear sides of the pair of left and right main frames 24, and a pair of left and right seat frames 28 provided to the pair of left and right pivot plates 26 and extending obliquely upward toward the rear. A power unit 30 configured to generate power is provided on the pair of left and right main frames 24. A swingarm 34 by which a rear wheel 32 as a drive wheel is rotatably supported is swingably supported by the pivot plates 26. The power unit 30 includes an engine 30a and a transmission 30b which are housed inside a case thereof.

A fuel tank 36 for storing a fuel is provided above the pair of left and right main frames 24. A driver seat 38 where a driver is to be seated is provided in the rear of the fuel tank 36 and above the pair of left and right seat frames 28. A passenger seat 40 where a passenger is to be seated is provided in the rear of the driver seat 38. A front fender 40 is provided on the pair of left and right front forks 20. A rear fender 44 is provided on rear portions of the pair of left and right seat frames 28. This rear fender 44 supports rear turn signals 46.

Moreover, the motorcycle 12 includes an upper cowl 48 provided to the vehicle body frame 16 and protecting a front side, a wind screen 50 provided above the upper cowl 48, rear-view mirrors 52 provided in upper portions of the upper cowl 48 and enabling the driver to check the rear view, a headlight 54 as a front light provided in a front portion of the upper cowl 48 and configured to illuminate an area ahead, middle cowls 56 protecting front side portions of the motorcycle 12, under covers 58 provided on lower portions of the middle cowls 56 and extending rearward of the vehicle, and side covers 60 provided above the seat frames 28 and covering an area from upper portions of the seat frames 28 to lower portions of the driver seat 38. The rear-view mirrors 52 internally include front turn signals.

Figure 2:
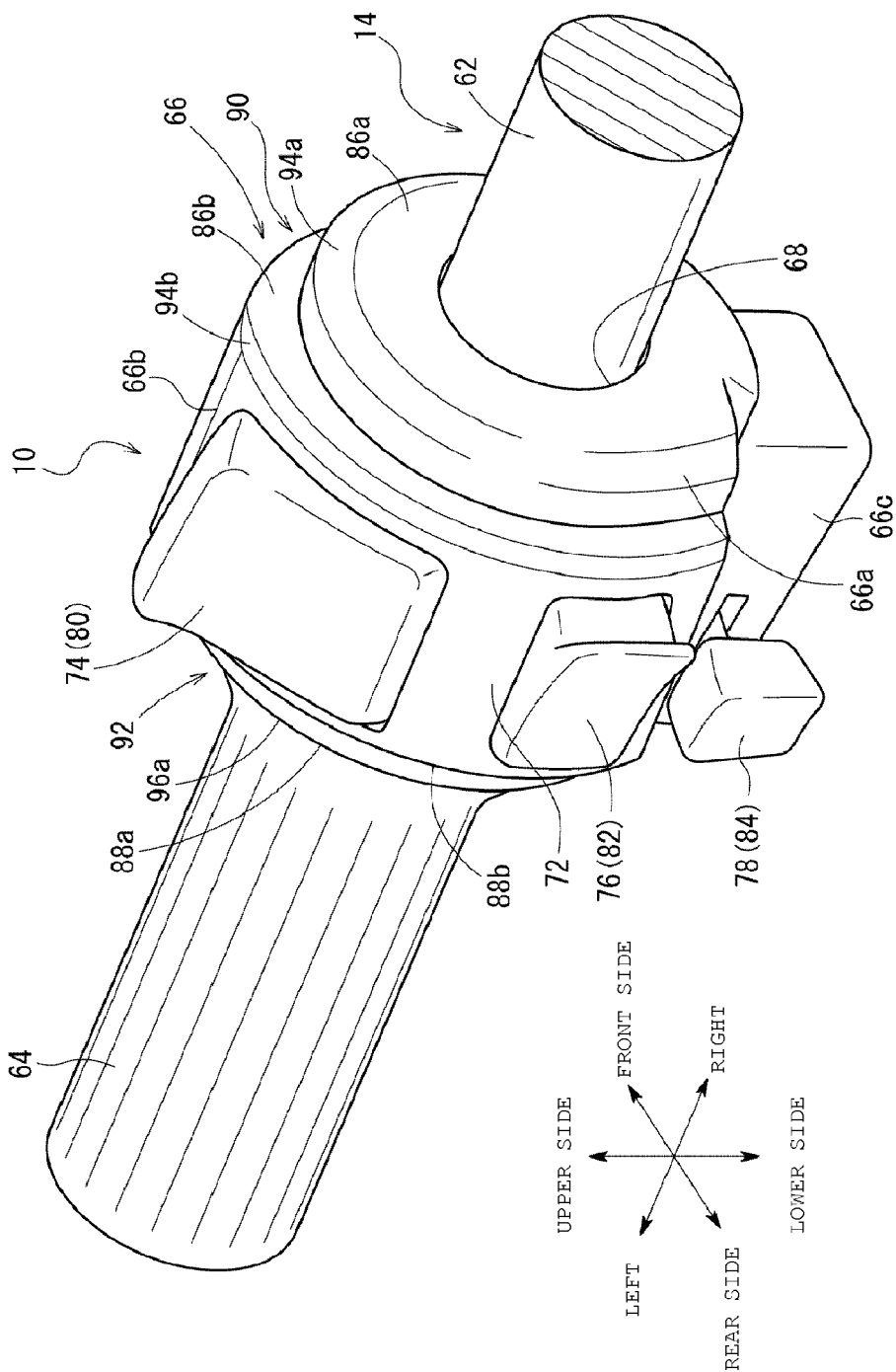
FIG. 2 is a perspective view illustrating a state where the handlebar switch is attached to a handlebar of the motorcycle in FIG. 1.

Next, a configuration of the handlebar switch according to certain embodiments is described with reference to FIGS. 2 to 4.

The handlebar switch 10 is attached to a handlebar member 62, which constitutes the handlebar 14, at a place close to a left grip 64.

The handlebar switch 10 includes a switch case 66 made of a resin and attached to the handlebar member 62. A through hole 68 is formed in the switch case 66 in such a manner as to pass through the switch case 66 in the left-right direction along the handlebar member 62. The handlebar member 62 is inserted into the through hole 68, and an engagement member 70 is engaged with the handlebar member 62 in that state. In this way, the switch case 66 is fixedly held at the place in the handlebar member 62 close to the left grip 64.

The switch case 66 includes a main body section 66a having an approximately cylindrical shape extending in the left-right direction, and having the through hole 68 formed therein, an expanded section (center portion) 66b expanded from a center portion of the main body section 66a in radial directions of the main body section 66a, and a base section 66c having a cubic shape protruding downward from a bottom portion of the main body section 66a.

In the motorcycle 12 (see FIG. 1), two manipulation members 74, 76 are provided at upper and lower positions in a center part of a first face 72 of the expanded section 66b. The first face 72 is a surface opposed to a driver when the driver is seated on the driver seat 38, and the two manipulation members 74, 76 are operable by the driver, who grips the left grip 64, by using the left thumb. In addition, another manipulation member 78 operable by the driver by using the left thumb is provided at a part of the base section 66c below the manipulation members 74, 76.

The manipulation member 74 is a switch for operating a dimmer switch 80 housed in the switch case 66. When the driver manipulates the manipulation member 74 in the up-down direction by using the left thumb, the dimmer switch 80 operates to switch the direction of a light axis of the headlight 54 between upward (high beam) and downward (low beam), or to switch the headlight 54 to a flashing state.

The manipulation member 76 is a switch for operating a horn switch 82 housed in the switch case 66. When the driver manipulates the manipulation member 76 in the left-right direction by using the left thumb, the horn switch 82 operates to cause a warning horn to make a sound. Here, a width of the manipulation member 76 in the left-right direction is approximately equal to a width of the manipulation member 74 in the left-right direction.

The manipulation member 78 is a switch for operating a turn signal switch 84 housed in the switch case 66. When the driver manipulates the manipulation member 78 in the left-right direction by using the left thumb, the turn signal switch 84 operates to light desired ones of the front turn signals and the rear turn signals 46.

In the manipulation member 76, it is preferable that a surface to be touched with the left thumb of a driver be inclined obliquely so as to be pleasant to the touch with the left thumb and thereby to improve the operability of the manipulation member 76.

Figure 3:
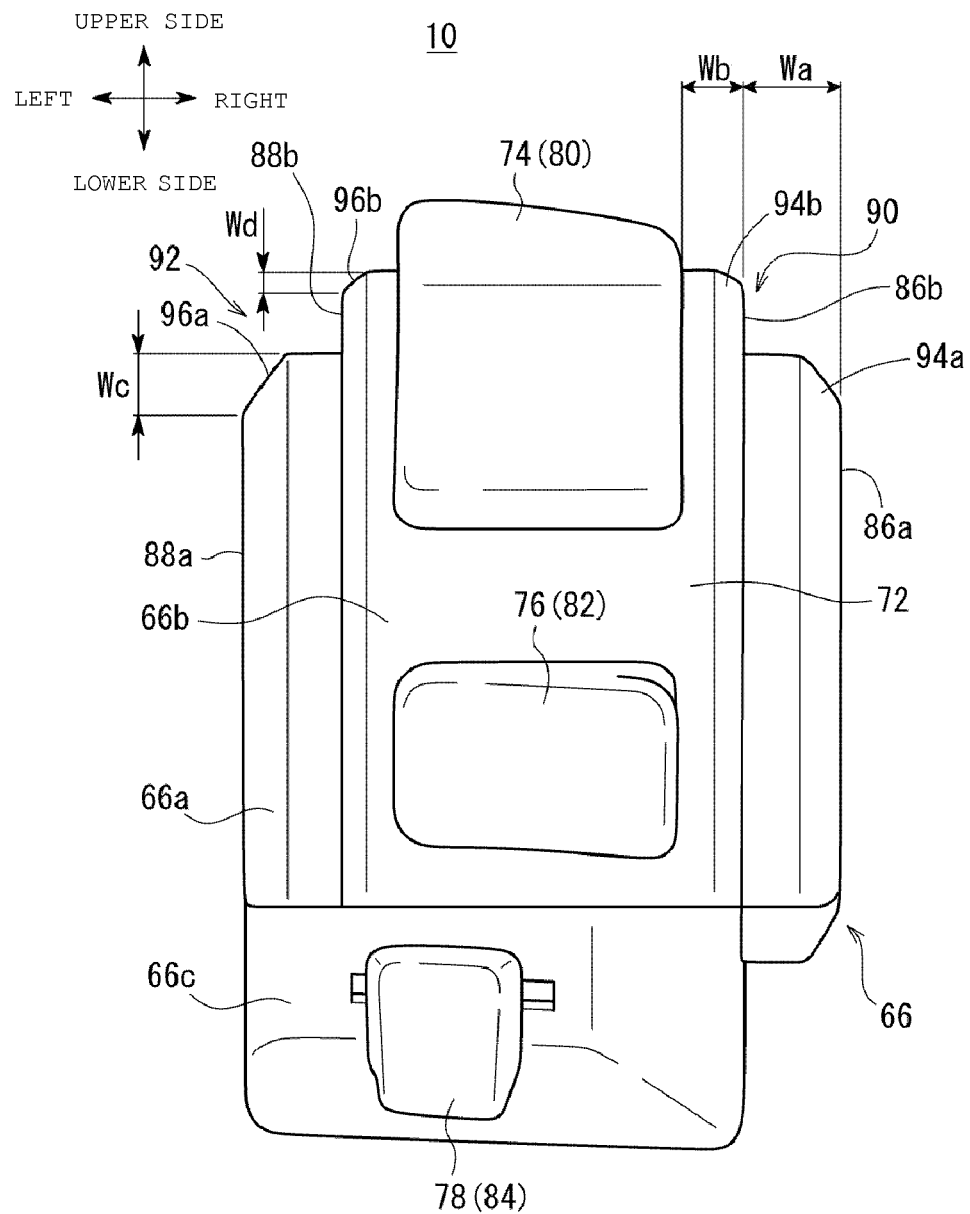
FIG. 3 is a front view of the handlebar switch in FIG. 2.

In a front view illustrated in FIG. 3, the expanded section 66b is formed in such a way that the center portion of the main body section 66a is expanded upward beyond a right end portion 86a and a left end portion 88a of the main body section 66a, which are both end portions of the switch case 66. Thus, in the front view of FIG. 3, the main body section 66a and the expanded section 66b of the switch case 66 are formed symmetrically in the left-right direction with the expanded section 66b centered.

In addition, in the front view of FIG. 3, a portion of the manipulation member 74 for the dimmer switch 80 protrudes upward from the expanded section 66b. Thus, a step portion 90 is formed by the portion of the manipulation member 74, a right end portion 86b of the expanded section 66b, and the right end portion 86a of the main body section 66a, and a step portion 92 is formed by the portion of the manipulation member 74, a left end portion 88b of the expanded section 66b, and the left end portion 88a of the main body section 66a.

Moreover, in the main body section 66a, a corner part 94a on an upper side of the right end portion 86a and a corner part 96a on an upper side of the left end portion 88a are chamfered to incline with respect to the expanded section 66b. Similarly, in the expanded section 66b, a corner part 94b on an upper side of the right end portion 86b and a corner part 96b on an upper side of the left end portion 88b are chamfered to incline with respect to the expanded section 66b.

As described above, the shape of the main body section 66a and the expanded section 66b is symmetric in the left-right direction. For this reason, in the expanded section 66b, a width between the manipulation member 74 and the right end portion 86b and a width between the manipulation member 74 and the left end portion 88b in the left-right direction are a substantially equal width Wb which is a width of remaining margins of the expanded section 66b excluding the manipulation members 74, 76. In the main body section 66a, a width between the right end portions 86a and 86b and a width between the left end portions 88a and 88b in the left-right direction are a substantially equal width Wa. In this case, the width Wa and the width Wb have a relationship of Wa>Wb. When Wc denotes an inclination width of the chamfered corner parts 94a, 96a in the up-down direction and Wd denotes an inclination width of the chamfered corner parts 94b, 96b in the up-down direction, the width Wc and the width Wd have a relationship of Wc>Wd.

In this way, in the front view of FIG. 3, the layout of an upper side portion of the handlebar switch 10 is designed in a shape tapered by the formation of the step portions 90, 92, and the formation of the inclined parts by chamfering the corner parts 94a, 94b, 96a, 96b.

Figure 4:
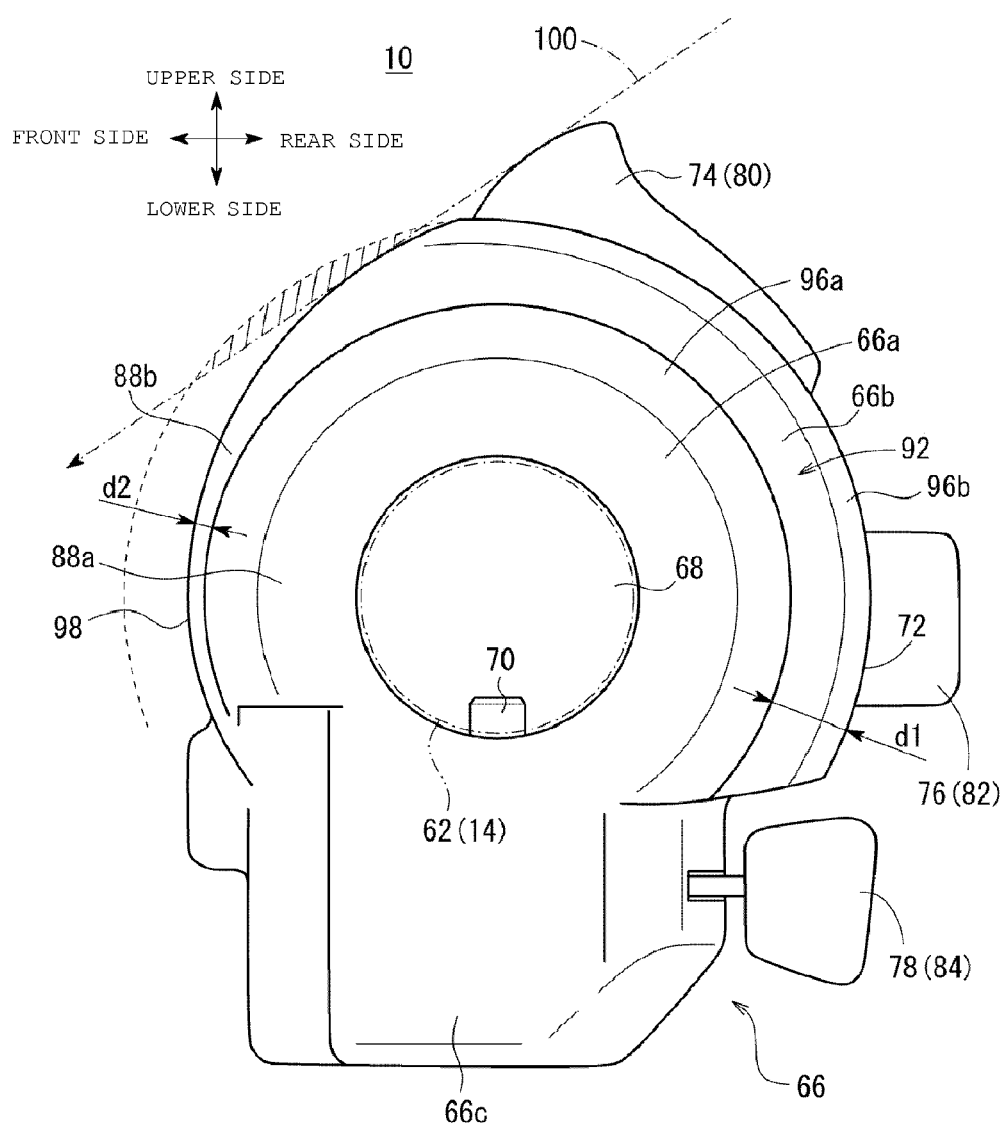
FIG. 4 is a side view of the handlebar switch in FIG. 2.

Moreover, in a side view illustrated in FIG. 4, the expanded section 66b is formed in such a way that a portion of the main body section 66a other than the base section 66c is expanded in the radial directions of the main body section 66a. In this case, the expanded section 66b on a first face 72 side to be opposed to the driver has a predetermined thickness d1.

On the other side, the expanded section 66b has a second face 98 extending seamlessly from the first face 72 and being distant from the driver. In other words, the second face 98 is formed on the front side of the motorcycle 12, and has none of the manipulation members 74, 76, 78 arranged therein. In this case, a thickness of the expanded section 66b on a second face 98 side is set to a thickness d2 which decreases with an increase in a distance from the driver and the first face 72. More specifically, as an imaginary line of the thickness d1 is illustrated on the second face 98 side by a broken line in FIG. 4, the expanded section 66b is formed in such a shape that the second face 98 side is gradually thinned in comparison with the first face 72 side, as the distance from the driver and the first face 72 increases.

Hence, when the driver directs a line of sight 100, which is illustrated by a dashed-dotted line with an arrow, to the handlebar switch 10, a hatched portion in FIG. 4 has nothing to block the field of view of the driver. In this way, the back side of the expanded section 66b, i.e., the second face 98 side is not expanded, which produces an effect of making the handlebar switch 10 visually look small to the driver.

The handlebar switch 10 according to the present embodiment is configured as described above. Next, effects of the handlebar switch 10 are described with reference to FIGS. 5A and 5B.

Figure 5A:
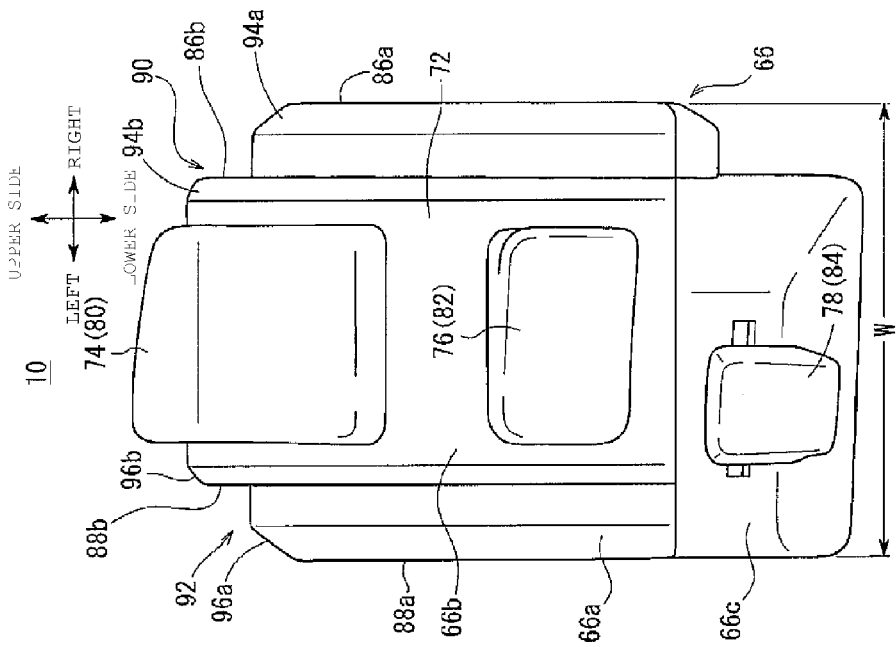
FIG. 5A is a front view of the handlebar switch according to the embodiment.
Figure 5B:
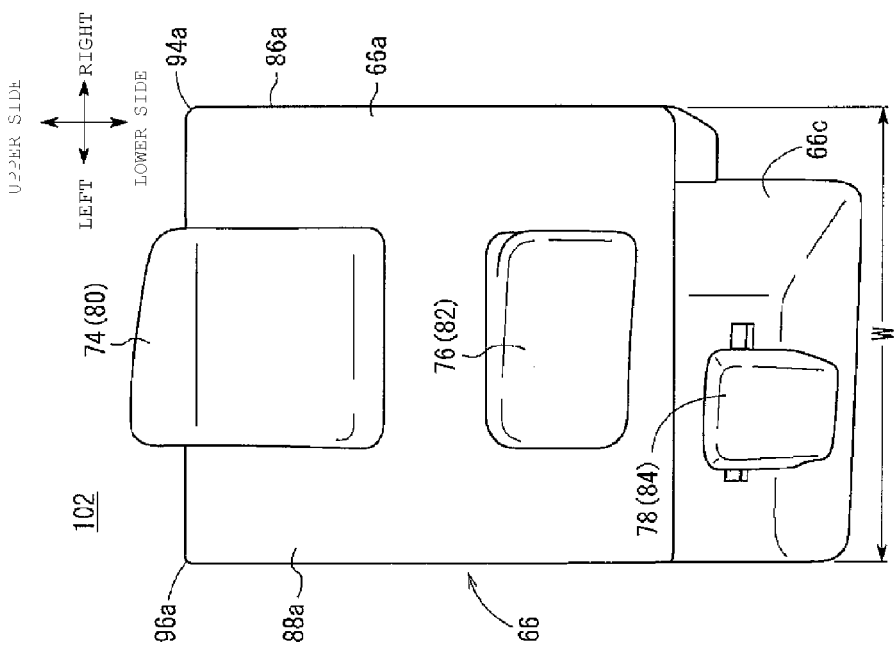
FIG. 5B is a front view of a handlebar switch according to a comparative example.

FIG. 5B is a front view of a handlebar switch 102 according to a comparative example, and FIG. 5A is a front view of the handlebar switch 10 according to certain embodiments. Here, for the handlebar switch 102, the same constituent elements as the handlebar switch 10 are described by being given the same reference numerals.

The handlebar switch 10 according to certain embodiments and the handlebar switch 102 according to the comparative example have a same width W in the left-right direction.

The handlebar switch 102 according to the comparative example, however, is not provided with the step portions 90, 92 provided in the handlebar switch 10 according to certain embodiments. In other words, the main body section 66a of the handlebar switch 102 is expanded to the range in which the expanded section 66b is expanded in the handlebar switch 10.

For this reason, when the driver looks at the handlebar switch 102, the handlebar switch 102 unavoidably visually looks larger than the handlebar switch 10 to the driver, even though the two handlebar switches 10, 102 have the same width W.

In contrast, in the handlebar switch 10 according to certain embodiments, as illustrated in FIG. 5A, the center portion of the main body section 66a is formed as the expanded section 66b by being expanded beyond the right end portion 86a and the left end portion 88a of the main body section 66a, which are both end portions of the switch case 66, and the manipulation members 74, 76 for the switches 80, 82 are arranged in the expanded section 66b. In this way, the switch case 66 is provided with the step portions 90, 92 which are symmetric in the left-right direction with the expanded section 66b centered.

Consequently, the handlebar switch 10 can impress the driver as small in the left-right direction along the handlebar 14, that is, the width direction of the handlebar switch 10. To put it differently, the handlebar switch 10 illustrated in FIG. 5A is enabled to look smaller than the handlebar switch 102 illustrated in FIG. 5B, even while the handlebar switch 10 has the same width W as the handlebar switch 102. Hence, according to the present embodiment, the handlebar switch 10 can look visually compact.

Moreover, the formation of the expanded section 66b enables the switches 80, 82 to be housed in the expanded section 66b.

When the center portion of the switch case 66 is formed as the expanded section 66b in the aforementioned way, it is possible to make the external appearance of the handlebar switch 10 look compact while securing the capacity of the switch case 66 for the switches 80, 82, 84.

Additionally, in the handlebar switch 10, the second face 98 side of the expanded section 66b where the manipulation members 74, 76, 78 are not arranged is formed in the shape not protruded but gradually thinned with an increase in the distance from the first face 72. This shaping makes the depth of the handlebar switch 10 small, and offsets the handlebar switch 10 toward the first face 72 side of the expanded section 66b. When the thickness d2 of the second face 98 side of the expanded section 66b is decreased as described above, it is possible to make the handlebar switch 10 visually look much smaller when the driver looks at the handlebar switch 10.

Further, the width Wb of the remaining margins of the expanded section 66b excluding the arrangement parts of the manipulation members 74, 76 is set to be narrower than the width Wa of the right end portion 86a side and the left end portion 88a side of the main body section 66a (Wa>Wb). This setting can make the handlebar switch 10 look so much smaller.

Still further, since the portion of the manipulation member 47 protrudes from the expanded section 66b, the layout of the handlebar switch 10 is designed in a shape tapered upward as indicated by two imaginary lines connecting the right end portion 86a and the left end portion 88a of the main body section 66a, the right end portion 86b and the left end portion 88b of the expanded section 66b, and the portion of the manipulation member 74. This layout is capable of making the driver feel that the handlebar switch 10 has a compact shape.

Moreover, when the manipulation member 74 is a manipulation member for the switch 80 for operating the headlight 54 as an electric component of the motorcycle 12, for example, the driver can adjust the direction of the light axis of the headlight 54 by manipulating the manipulation member 74.

Also, the corner parts 94b, 96b of the expanded section 66b and the corner parts 94a, 96a of the main body section 66a are chamfered to incline with respect to the expanded section 66b. This makes the handlebar switch 10 rounded as a whole in an arc shape. As a result, in the front view of FIG. 3, the handlebar switch 10 can be made to look compact. This also can improve the finger touch that the driver feels when touching any of the manipulation members 74, 76, 78.

In addition, the inclination width Wc of the corner parts 94a, 96a of the main body section 66a is set larger than the inclination width Wd of the corner parts 94b, 96b of the expanded section 66b (Wc>Wd). This setting can make the handlebar switch 10 look more compact, and further improve the finger touch that the driver feels when touching any of the manipulation members 74, 76, 78.

Figure 6:
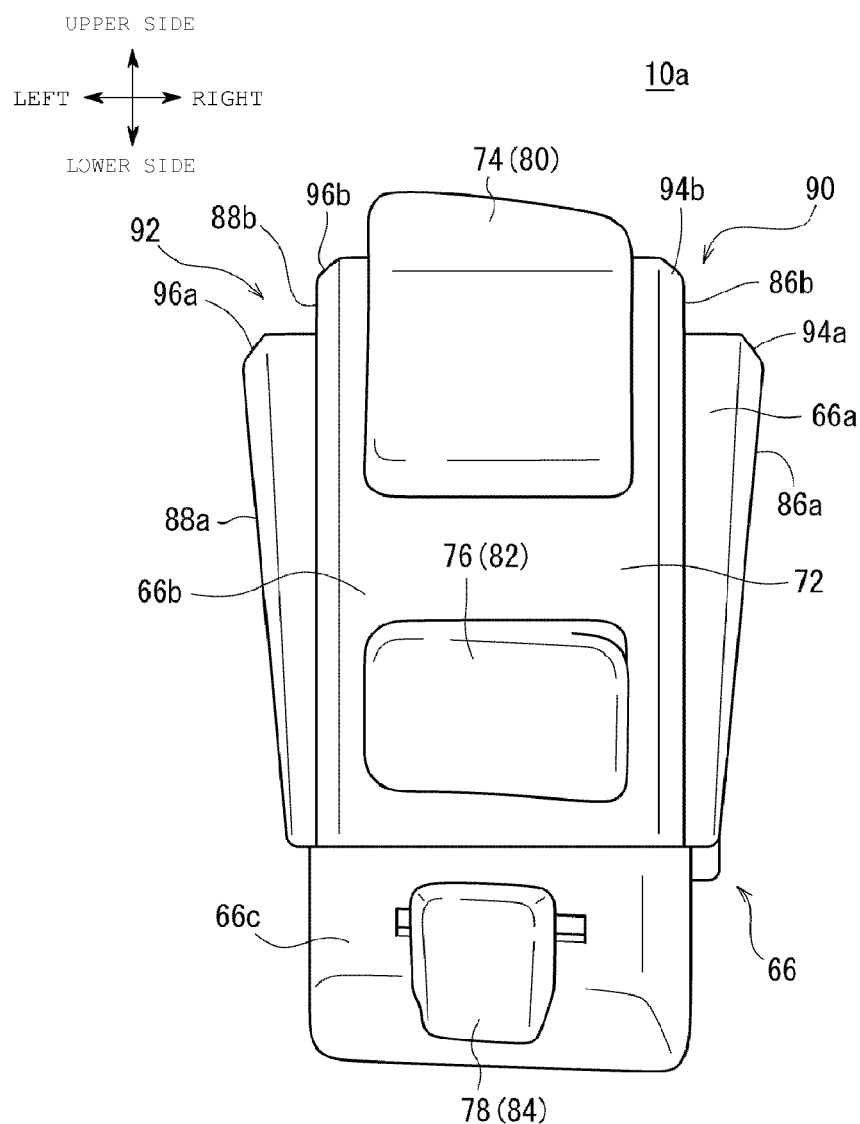
FIG. 6 is a front view of a handlebar switch according to a modified example of the embodiment.

The handlebar switch 10 according to certain embodiments can be modified to a handlebar switch 10a according to a modified example in FIG. 6.

The handlebar switch 10a according to the modified example is formed such that the right end portion 86a and the left end portion 88a of the main body section 66a are tapered downward. Accordingly, in the handlebar switch 10a, the base section 66c is set to have a relatively small width in the left-right direction corresponding to the tapered shapes of the right end portion 86a and the left end portion 88a. In this handlebar switch 10a according to the modified example, the step portions 90, 92 and the like are also formed. Thus, the handlebar switch 10a can easily produce the aforementioned effects of the handlebar switch 10 according to the above embodiments.

Although certain embodiments have been described above, the technical scope of the present invention should not be limited to the range of the description of the aforementioned embodiments. It is apparent to those skilled in the art that the aforementioned embodiments can be altered or modified in various manners. From the description of the scope of claims, it is obvious that embodiments thus altered or modified should be included in the technical scope of the present invention. The reference numerals in parentheses described in the scope of claims are added in the same way as in the accompanying drawings in order to facilitate understanding of the present invention, and the present invention should not be interpreted by being limited to the constituent elements to which the reference numerals are given.

EXPLANATION OF THE REFERENCE NUMERALS 10, 10a HANDLEBAR SWITCH
12 MOTORCYCLE
14 HANDLEBAR
54 HEADLIGHT
62 HANDLEBAR MEMBER
64 LEFT GRIP
66 SWITCH CASE
66a MAIN BODY SECTION
66b EXPANDED SECTION
66c BASE SECTION
72 FIRST FACE
74, 76, 78 MANIPULATION MEMBER
80 DIMMER SWITCH
82 HORN SWITCH
84 TURN SIGNAL SWITCH
86a, 86b RIGHT END PORTION
88a, 86a LEFT END PORTION
90, 92 STEP PORTION
94a, 94b, 96a, 96b CORNER PART
98 SECOND FACE
100 LINE OF SIGHT

We claim:

1. A handlebar switch, comprising:
a switch case configured to house switches, which are configured to operate electric components of a vehicle; and
manipulation members configured to be manipulated by an operator of the vehicle to operate the respective switches,
wherein at least one of the manipulation members is disposed in a center portion of the switch case,
wherein the center portion of the switch case comprises an expanded section that is configured to expand in a direction crossing a handlebar beyond both end portions of the switch case in a direction along the handlebar,
wherein the at least one of the manipulation members is located in a center part of the expanded section, and
wherein a width of remaining margins of the expanded section, which are obtained by excluding an arrangement part of the at least one of the manipulation members from a width of the expanded section in the direction along the handlebar, is narrower than a width of the end portions of the switch case.

2. The handlebar switch according to claim 1, wherein the expanded section has a first face opposed to the operator, and a second face extending seamlessly from the first face and being distant from the operator, the at least one of the manipulation members being disposed not in the second face, but in the first face,
wherein a thickness of the expanded section on a first face side is a predetermined thickness, and
wherein a thickness of the expanded section on a second face side decreases as a distance from the first face increases.

3. The handlebar switch according to claim 1, wherein the at least one of the manipulation members is disposed in the expanded section, and
wherein a portion of the at least one of the manipulation members is configured to protrude from the expanded section in a front view.

4. The handlebar switch according to claim 3, wherein the at least one of the manipulation members comprises a manipulation member for a switch to operate a front light of the vehicle as the electric component.

5. The handlebar switch according to claim 1, wherein corner parts of the expanded section and corner parts of both the end portions of the switch case are chamfered to incline with respect to the expanded section.

6. The handlebar switch according to claim 1, wherein the handlebar switch is attached to the handlebar, and wherein the handlebar is configured to be used to steer the vehicle.

7. A handlebar switch, comprising:
a switch case configured to house switches, which are configured to operate electric components of a vehicle; and
manipulation members configured to be manipulated by an operator of the vehicle to operate the respective switches,
wherein at least one of the manipulation members is disposed in a center portion of the switch case,
wherein the center portion of the switch case comprises an expanded section that is configured to expand in a direction crossing a handlebar beyond both end portions of the switch case in a direction along the handlebar,
wherein the at least one of the manipulation members is located in a center part of the expanded section,
wherein corner parts of the expanded section and corner parts of both the end portions of the switch case are chamfered to incline with respect to the expanded section, and
wherein an inclination width of the corner parts of both the end portions of the switch case is larger than an inclination width of the corner parts of the expanded section.

8. A handlebar switch, comprising:
accommodating means for accommodating switches for operating electric components of a vehicle are housed; and
manipulating means for operating the respective switches,
wherein a manipulation member of the manipulating means is disposed in a center portion of the accommodating means,
wherein the center portion of the accommodating means is an expanded section that is configured to expand in a direction crossing a steering means for steering the vehicle, beyond both end portions of the accommodating means in a direction along the steering means,
wherein the at least one manipulation member is located in a center part of the expanded section, and
wherein a width of remaining margins of the expanded section, which are obtained by excluding an arrangement part of the manipulating means from a width of the expanded section in the direction along the steering means, is narrower than a width of the end portions of the accommodating means.

9. The handlebar switch according to claim 8, wherein the expanded section has a first face opposed to the operator, and a second face extending seamlessly from the first face and being distant from the operator, the manipulating means being disposed not in the second face, but in the first face,
wherein a thickness of the expanded section on a first face side is a predetermined thickness, and
wherein a thickness of the expanded section on a second face side decreases as a distance from the first face increases.

10. The handlebar switch according to claim 8, wherein at least one manipulation member of the manipulating means is arranged in the expanded section, and
wherein a portion of the manipulation member is configured to protrude from the expanded section in a front view.

11. The handlebar switch according to claim 10, wherein the at least one manipulation member is a manipulation member for a switch to operate a front light of the vehicle as the electric component.

12. The handlebar switch according to claim 8, wherein corner parts of the expanded section and corner parts of both the end portions of the accommodating means are chamfered to incline with respect to the expanded section.

13. The handlebar switch according to claim 8, wherein the handlebar switch is attached to the steering means.

14. A handlebar switch, comprising:
accommodating means for accommodating switches for operating electric components of a vehicle are housed; and
manipulating means for operating the respective switches,
wherein a manipulation member of the manipulating means is disposed in a center portion of the accommodating means,
wherein the center portion of the accommodating means is an expanded section that is configured to expand in a direction crossing a steering means for steering the vehicle, beyond both end portions of the accommodating means in a direction along the steering means,
wherein the at least one manipulation member is located in a center part of the expanded section,
wherein corner parts of the expanded section and corner parts of both the end portions of the accommodating means are chamfered to incline with respect to the expanded section, and
wherein an inclination width of the corner parts of both the end portions of the accommodating means is larger than an inclination width of the corner parts of the expanded section.

15. A method of operating a handlebar switch, the method comprising:
using switches housed in a switch case to operate electric components of a vehicle; and
manipulating manipulation members configured to be manipulated by an operator of the vehicle to operate the respective switches,
wherein at least one of the manipulation members is disposed in a center portion of the switch case, wherein the center portion of the switch case comprises an expanded section that is configured to expand in a direction crossing a handlebar beyond both end portions of the switch case in a direction along the handlebar, wherein the at least one of the manipulation members is located in a center part of the expanded section, and wherein a width of remaining margins of the expanded section, which are obtained by excluding an arrangement part of the at least one of the manipulation members from a width of the expanded section in the direction along the handlebar, is narrower than a width of the end portions of the switch case.

* * * * *